US012633838B2

(12) United States Patent
Libert

(10) Patent No.: US 12,633,838 B2
(45) Date of Patent: May 19, 2026

(54) INVARIABLE-CHANGE-COMPONENT-BASED POWER CONVERTER

(71) Applicant: ELECTRIC HYDROGEN CO., Natick, MA (US)

(72) Inventor: Adam Libert, Pacifica, CA (US)

(73) Assignee: Electric Hydrogen Co., Devens, MA (US)

( * ) Notice: Subject to any disclaimer, the term of this patent is extended or adjusted under 35 U.S.C. 154(b) by 212 days.

(21) Appl. No.: 18/703,892

(22) PCT Filed: Dec. 21, 2022

(86) PCT No.: PCT/US2022/053617
§ 371 (c)(1),
(2) Date: Apr. 23, 2024

(87) PCT Pub. No.: WO2023/122157
PCT Pub. Date: Jun. 29, 2023

(65) Prior Publication Data
US 2025/0007419 A1    Jan. 2, 2025

Related U.S. Application Data

(60) Provisional application No. 63/293,696, filed on Dec. 24, 2021.

(51) Int. Cl.
| | |
|---|---|
| *H02M 5/12* | (2006.01) |
| *H02M 1/12* | (2006.01) |
| *H02M 7/08* | (2006.01) |
| *H02P 13/06* | (2006.01) |

(52) U.S. Cl.
CPC .............. *H02M 5/12* (2013.01); *H02M 1/12* (2013.01); *H02M 7/08* (2013.01); *H02P 13/06* (2013.01)

(58) Field of Classification Search
CPC . H02M 5/12; H02M 1/12; H02M 7/08; H02P 13/06
See application file for complete search history.

(56) References Cited

U.S. PATENT DOCUMENTS

| | | | | |
|---|---|---|---|---|
| 5,343,080 A | * | 8/1994 | Kammeter | ............ H01F 27/385 |
| | | | | 336/5 |
| 7,353,085 B2 | * | 4/2008 | Rusta-Sallehy | ... H01M 8/04007 |
| | | | | 700/299 |
| 8,148,918 B2 | * | 4/2012 | Ger | .................... H05B 41/3927 |
| | | | | 315/307 |

(Continued)

FOREIGN PATENT DOCUMENTS

KR          101997089 B1      7/2019

OTHER PUBLICATIONS

International Search Report and Written Opinion for PCT/US2022/053617, dated Jul. 6, 2023, pp. 1-10.

*Primary Examiner* — Michael J Jansen, II
(74) *Attorney, Agent, or Firm* — Lempia Summerfield Katz LLC

(57)                 ABSTRACT

A system and method of operation which includes a variable transformer coupled to an invariable rectifier, an invariable inverter, and/or other invariable change component. The variable transformer may be used to control power conversion levels. In some cases, the system may have bandwidth to support controlled power supply for one or more electrolyzer stacks.

11 Claims, 3 Drawing Sheets

(56)　　　　　References Cited

U.S. PATENT DOCUMENTS

| | | | |
|---|---|---|---|
| 8,958,223 B2 * | 2/2015 | Mariadassou ........... | H02M 7/08 |
| | | | 363/126 |
| 10,003,276 B2 * | 6/2018 | Josse ....................... | H02M 7/08 |
| 12,088,213 B2 * | 9/2024 | Tremblay ................. | H02J 7/04 |
| 2004/0160216 A1 * | 8/2004 | Speranza .............. | H02M 3/285 |
| | | | 320/140 |
| 2005/0197743 A1 * | 9/2005 | Rusta-Sallehy ......... | C25B 15/02 |
| | | | 429/429 |
| 2009/0261758 A1 * | 10/2009 | Ger .................... | H05B 41/3927 |
| | | | 315/307 |
| 2013/0301320 A1 * | 11/2013 | Mariadassou ........... | H02M 7/08 |
| | | | 363/70 |
| 2016/0013729 A1 * | 1/2016 | Josse ........................ | H02J 7/35 |
| | | | 363/126 |
| 2021/0363651 A1 * | 11/2021 | Seymour ............... | H02M 7/219 |
| 2022/0376631 A1 * | 11/2022 | Tremblay ................ | H02M 7/06 |
| 2025/0007419 A1 * | 1/2025 | Libert .................... | H02M 7/08 |

* cited by examiner

300

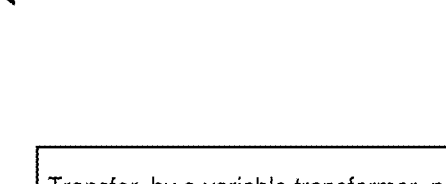

| Transfer, by a variable transformer, power from a power source to an output of the variable transformer. | 302 |

| Control the variable transformer to control power conversion output of the variable transformer | 304 |

| Perform one of i) rectify the power at the output of the variable transformer using an invariable rectifier or ii) invert the power at the output of the variable transformer using an invariable inverter | 306 |

Figure 3

INVARIABLE-CHANGE-COMPONENT-BASED POWER CONVERTER

This application is a § 371 nationalization of PCT Application Serial No. PCT/US2022/053617, filed Dec. 21, 2022, designating the United States, which claims the benefit of U.S. Provisional Application No. 63/293,696, filed Dec. 24, 2021, and entitled "Invariable-Change-Component-Based Power Converter," which are hereby incorporated by reference in their entireties.

FIELD

The following disclosure relates to invariable-change-component-based power conversion.

BACKGROUND

Electrolyzer systems use electrical energy to drive a chemical reaction. For example, water is split to form hydrogen and oxygen. The products may be used as chemical feedstocks into industrial processes, and they may be used as energy sources for later use. In recent years, improvements in operational efficiency have made electrolyzer systems competitive market solutions for energy storage, generation, and/or transport. For example, the cost of generation may be below $10 per kilogram of hydrogen in some cases. Increases in efficiency and/or improvements in operation will continue to drive installation of electrolyzer systems.

BRIEF DESCRIPTION OF THE DRAWINGS

Example implementations are described herein with reference to the following drawings.

FIG. 3 shows an example method for converting power from a power source to be provided to a load.

DETAILED DESCRIPTION

Figure 1:
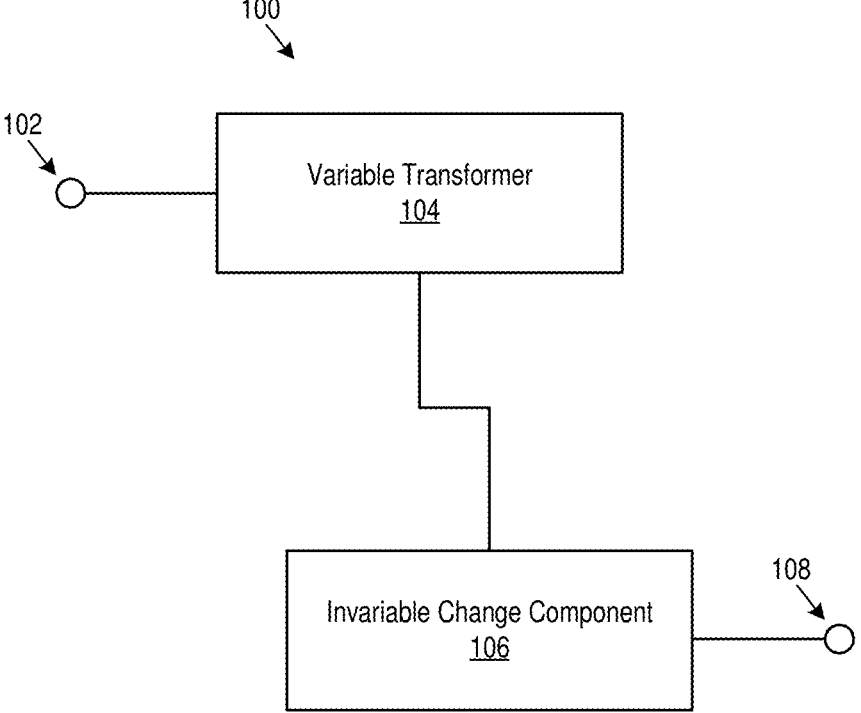
FIG. 1 shows an example invariable-change-component-based power converter.

The discussed architectures and techniques may support large-scale (and/or other scale) electrolysis systems directly or virtually connected to a renewable generation energy source, and/or electrolysis systems utilizing grid services. Everything described here can also be applied to electrochemical processes other than electrolysis, for example electrochemical reduction of oxide ores, chloralkali processes and the like, so long as they are powered by resources utilizing a power converter. Further, the architectures and techniques may support other non-electrochemical load schemes. For example, the architectures and techniques may support virtually any system designed to a provide an on-demand load (e.g., on-demand power consumption) responsive to transient conditions.

In some cases, renewable energy sources, which may be used to power an electrolyzer system, can have output that changes over time. For example, a solar generation system may produce little or no real power at night and power that fluctuates continuously during the day due to atmospheric changes. Accordingly, power source system may account for these changes through techniques such as power conversion. Further, target utilization of an electrolyzer system may change over time. For example, an electrolyzer system including multiple electrolyzer stacks may run at or near full capacity during one part of a particular day and below half-capacity during another part of the same day. Accordingly, the techniques and architectures discussed herein may provide electric systems that may support variable power output, e.g., for electrolysis systems and/or other systems with transient power demand.

According to the conventional wisdom, control systems equipped to handle swift shifts in power demand/availability are necessary to account for the transient effects discussed above. Contrary to the conventional wisdom, it is contemplated herein, that swift shifts due such transient effects may be rare. In further contravention to the conventional wisdom, even in such rare occurrences, there may be little gain from quickly executing changes in response to such short-lived shifts. Based on this reframing of the technical problem in contravention to the conventional wisdom, transient power demands such as weather shifts and/or electrolyzer operational power-requirements may change at frequencies around or lower than 1 Hz.

As an unexpected result of reanalysis of the reframed technical problem of electrochemical plant power control, control may be achieved using power converters based on invariable change components (e.g., invariable rectifiers, invariable inverters, and/or other invariable power conversion components). Change components may refer to components that convert the form of the electrical power. The invariable change component may be paired with a variable transformer (e.g., a tap-changing transformer, a variable autotransformer, or other variable transformer) that may change the voltage level of the electrical power.

An invariable component may refer to a component lacking a control input. For example, an invariable change component may be uncontrolled in that it relates input to output in a set functional relationship (that cannot be adjusted by signal on a control input). Accordingly, to adjust power conversion parameters in an invariable-change-component-based power converter (such as those discussed herein), adjustment may be implemented via adjustment of the variable transformer, e.g., without corresponding (or alternative) adjustment in a rectifier/inverter. In some cases, the control bandwidth of such systems may be lower than corresponding systems with active (e.g., controlled) components, such as thyristor rectifiers. Contrary to the conventional wisdom, the bandwidth capabilities of such active components are not necessary to the operation of at least some electrochemical systems. Further, the invariable-change-component-based architectures, which are designed contrary to the conventional wisdom, discussed herein may be comparatively lower cost than corresponding active component based systems.

In various examples, an invariable rectifier may include an invariable diode rectifier and/or various other rectifier types other than a thyristor-type rectifier.

FIG. 1 shows an example invariable-change-component-based power converter (sometimes referred to herein as simply "power converter") 100. The power converter 100 may include a first port 102, a variable transformer 104, an invariable change component 106 (e.g., such as an invariable rectifier, an invariable inverter, or other invariable change component), and a second port 108. The first port 102 and the second port 108 may operate as inputs or outputs depending on the direction of power flow through the converter 100. In a rectifier-based example, power may flow from the first port 102 to the second port 108. As example illustrative scenario for such a rectifier-based example, power (e.g., alternating current (AC) power) from a power source coupled to the first port may be supplied to a load, such as an electrochemical stack, coupled to the second port 108 with direct current (DC) power.

Although the power converter 100 is generally described herein as being an AC to DC power converter with power flowing through the power converter 100 in the direction from the first port 102 to the second port 108, in various cases using an invariable inverter, power may flow through the power converter 100 in the direction from the second port 108 to the first port 102, and DC to AC conversion may be provided. Thus, in an example, power from a DC power source may first be inverted by an invariable inverter to generate AC power, and the AC power may be transferred to a load by a variable transformer as described herein. Additionally or alternatively, AC to AC implementations may be executed.

In an example, the power converter 100 may be utilized for power conversion in an electrochemical plant (or one or more individual electromechanical stacks). In this example, the port 102 of the power converter 100 may be an input port coupled to an AC power source, and the port 108 of the power converter 100 may be an output port coupled to the one or more electromechanical stacks. The AC power source may comprise a power grid, a renewable energy source and/or other suitable power source. The renewable energy source may be a renewable energy source such as an on-site dedicate renewable energy source or an off-site renewable energy source. The renewable energy source may include one or more of a solar plant, windfarm, fuel cell array, or other on-site power source and/or power generation source, for example.

The variable transformer 104 may be configured to transfer the AC power from the power source to an output of the variable transformer 104. The variable transformer 104 may be controllable to regulate or otherwise control power conversion of the variable transformer 104. For example, the output voltage of the variable transformer 104 may be regulated or otherwise controlled based on varying amount of power that may be available from the power source and/or based on varying power requirements of the load (e.g., one or more electromechanical stacks). The power amount of power available from the power source and/or the power requirements of the load may vary based on time of day, for example. In an example, a processor or controller (not shown) may be coupled to a control input of the variable transformer 104, and the processor or controller may be configured to control the output voltage of the variable transformer 104 based on varying amount of power that may be available from the power source and/or based on varying power requirements of the load (e.g., one or more electromechanical stacks).

In an example, the variable transformer 104 may include a tap changing transformer, such as an on-load tap changing transformer (OLTC). Taps may be provided on coil windings, and one or more control signals may be provided to a control input of the tap changing transformer to decrease or increase the number of turns in the windings in the tap changing transformer, thereby changing the turn ratio in the variable transformer 104 and regulating or otherwise controlling the output voltage of the variable transformer 104.

Additionally or alternatively, in some examples, the variable transformer 104 may include a variable autotransformer. The variable autotransformer may include a single coil and a plurality of taps. One or more control signals may be provided to a control input of the variable autotransformer to decrease or increase a ratio between a length of a primary portion of the coil and a secondary portion of the coil, thereby regulating or otherwise controlling the output voltage of the variable transformer 104. In at least some cases, a variable autotransformer may be cheaper than a tap changing transformer. A variable autotransformer may be utilized in examples in which galvanic isolation is not required.

In other examples, the variable transformer 104 may additionally or alternatively include other variable transformer configurations and/or other suitable transformer control techniques to control the variable transformer 104 may be utilized.

The invariable changing component 106 may be configured to rectify the power transferred from the power source by the variable transformer 104. The invariable changing component 106 may comprise an invariable diode rectifier or another suitable type of invariable rectifier. The invariable change component 106 may be uncontrolled in that may relate input to output in a set functional relationship (that cannot be adjusted by signal on a control input). In an example, the invariable changing component 106 does not include a control input. The invariable changing component 106 may provide AC to DC conversion of the AC power transferred by the variable transformer 104 to DC power required by the load, without any additional regulation or other control of the voltage at the output of the invariable changing component 106. Because the output of the invariable changing component 106 is not regulated or otherwise controlled via control of the invariable changing component 106, full capacity control and/or full voltage turndown required by the load may be entirely provided by the variable transformer 104. As discussed in more detail below in connection with FIG. 2, although the variable transformer 104 may have limited capacity control and limited voltage turndown capability (e.g., as compared to systems in which additional capacity and/or turndown capability may be provided by a controllable rectifier, such as a thyristor rectifier), the limited capacity control and limited voltage turndown capability of the variable transformer 104 may be well-suited for limited voltage turndown requirements of some loads, such as at least some electrochemical process and/or generation-following dispatchable loads. Also, a limited speed of a tap changing transformer (as compared, for example, to a thyristor rectifier) may be well-suited for the limited control bandwidth requirements of some loads, such as at least some electrochemical process and/or generation-following dispatchable loads. Thus, in at least some such cases, providing full capacity control and turndown voltage range for the load by the variable transformer 104, without any additional capacity and turndown volage control provided by the invariable changing component 106, may simplify the power converter 100, and reduce the cost of the power converter 100, as compared to a power converter in which additional control is provided (e.g., by a thyristor rectifier), while still meeting system power control requirements.

In some examples, the variable transformer 104 may include multiple variable transformers coupled such that the outputs of the multiple variable transformers are phase-shifted relative to one another. Such phase shifting may be used to cancel various undesirable signal components. For example, the multiple variable transformers may be phase-shifted relative to one another such that harmonic current and/or voltage components are cancelled. In some examples with multiple variable transformers, the invariable changing component 106 may also include multiple invariable changing components, such as multiple multi pulse diode rectifiers, corresponding to the multiple variable transformers included in the variable transformer 104. In such examples, each of the multiple variable transformers may be connected to a respective invariable changing component, such as a respective multi pulse diode rectifier. The outputs of the invariable changing components may then feed multiple individual loads or may be combined in a series or in parallel to feed a single load.

Example Implementations

Various illustrative example implementations are discussed below with reference to FIG. 2. The illustrative example implementations are illustrative of the general architectures and techniques described above and in the claims below. Designations of particular features such as "key", "critical", "important", "must", and/or other similar designations are included to clarify the relationship of that particular feature to the specific illustrative scenario/scenarios in which the particular feature is discussed. Such a relationship to the same degree may not apply without express description of such a relationship to other implementations. Nevertheless, such features described with respect to the individual example implementations may be readily integrated with other implementations with or without various other features present in the respective example implementation.

In some systems for water electrolysis or similar applications, thyristor rectifiers are used. The thyristor rectifier allows for high speed high precision control of the power converter's DC output voltage. However, when significant turndown is required, the voltage notching behavior of the thyristor rectifier may result in AC side harmonics. These harmonics are often forbidden by utilities for being detrimental to the grid. In some cases, a tap changing transformer may be placed before the thyristor rectifier. The thyristor rectifier is used for quick and precise turndown control of the power converter output, and the tap changing transformer is used for slower power quality correction by reducing the voltage input to the thyristor rectifier so that it doesn't have to do as much notching of the waveform.

Figure 2:
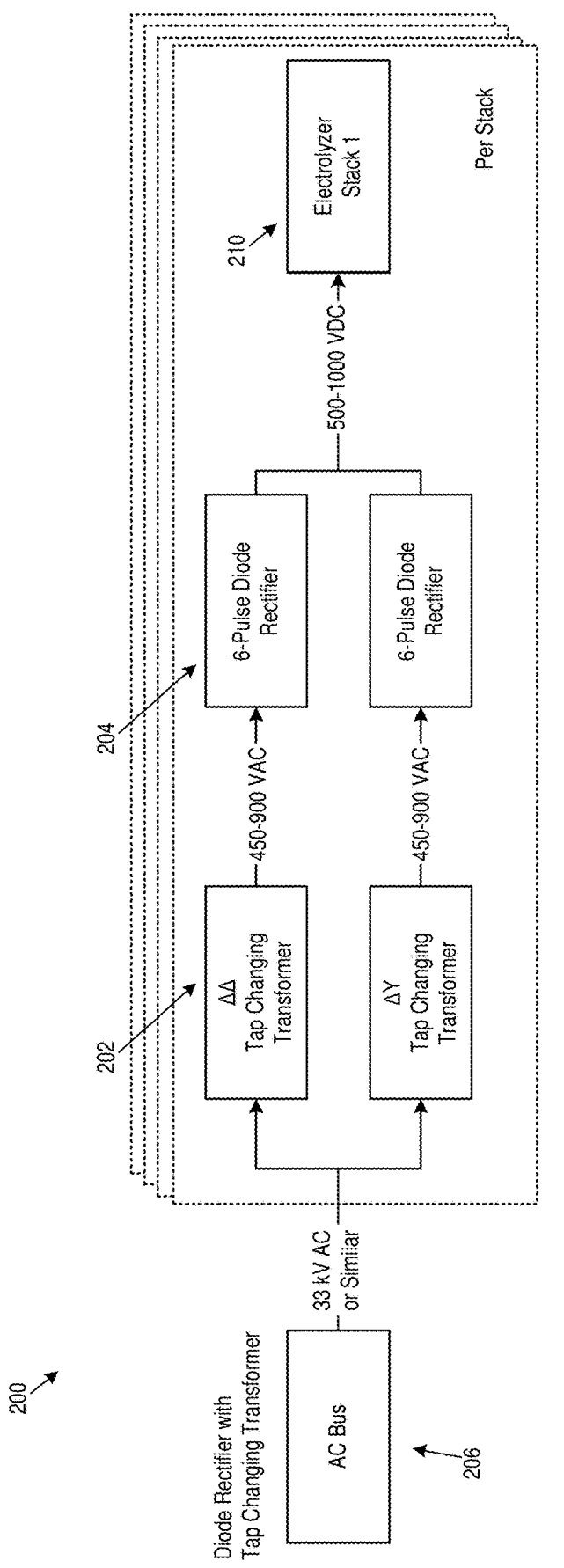
FIG. 2 shows an example AC-DC power conversion system for a hydrogen electrolyzer.

FIG. 2 shows an example AC-DC power conversion system 200 for a hydrogen electrolyzer 210 using a tap changing transformer 202 and an invariable diode rectifier 204. In examples, the tap changing transfer 202 may generally correspond the variable transformer 104 of FIG. 1 and the invariable diode rectifier 204 may generally correspond to the invariable change component 106 of FIG. 1. An input port of the tap changing transformer 202 may be coupled to a power source via an AC bus 206. An output of the invariable diode rectifier 204 may be coupled to an electrolyzer stack and may provide converted power to the electrolyzer stack.

Diode rectifiers are invariable in that they do not provide the ability to control or regulate their output. Tap changing transformers have the ability to regulate their output. Applications where the load does not require regulation at bandwidths more than about 1 Hz, a tap changing transformer in conjunction with a diode rectifier (or other invariable rectifier) may provide the transformation, rectification, and regulation required. In some cases, the invariable-change-component-based design may achieve cost savings relative to power conversion solutions based on active (controlled) component.

In the case of electrolysis of water, the tap changing transformer plus diode rectifier solution is effective at achieving large power turndown ratio because of the electrochemistry cut off voltage. Given that the activation potential for electrochemistry is often 67%-75% of the nominal operating voltage, the operating range of voltage regulation from the tap changing transformer to achieve full turndown may be 25%-33%, which is within the capability of many tap changing transformers. In various implementations using invariable change components, a turndown ratio of 25% voltage can correspond to a 100% turndown ratio for total power.

An illustrative example industrial application of this disclosure involves multiple (e.g., four) individual tap changing transformers phase shifted relative to each other to achieve harmonic cancellation and each connected to a multi pulse (e.g., six pulse) diode rectifier. These rectifier outputs may then feed multiple (e.g., four) individual loads or may be combined in a series or in parallel to feed a single load. This system architecture achieves very low harmonic content due to the phase shifting and cancellation of most harmonics that a diode rectifier produces. With certain loads, such as many electrochemistry cells or stacks, this architecture may also achieve significant turn down ratios at high efficiencies, high power quality, and sufficient control bandwidth.

In some examples, one or more variable autotransformers may be utilized in addition to or in place of the tap changing transformer 202. An autotransformer is another type of variable transformer like a tap changing transformer except that it does not provide galvanic isolation. In applications that do not require galvanic isolation, an autotransformer may be used and may, in some cases, be more economical than even a tap changing transformer.

The architectures and techniques may also be used for virtual any load (not just electrochemical ones) implementing generation to serve as a dispatchable consumer of electricity (e.g., to advantageously consumer power when conditions are favorable and reduce consumption when conditions are not). Further, the architectures and techniques can be well mated to a grid with high renewable penetration. The tap changing transformer and rectifier combination is fast enough to provide the capacity control for many loads if the source of power is a solar field (with some averaging across cells) or wind farm because the power spectra from those types of installations are recognized herein to create few high-frequency transients.

FIG. 3 shows an example power conversion method 300. In the method 300, power from a power source may be converted to power suitable for use by a load. The method 300 may be implemented by an invariable-change-component-based power converter that includes a variable transformer coupled to an invariable change component. In an example, the method 300 is implemented by the invariable-change-component-based power converter 100 of FIG. 1. In another example, the power conversion method 300 is implemented in the power conversion system 200 of FIG. 2. In other examples, the power conversion method 300 is implemented by suitable devices different from the invariable-change-component-based power converter 100 and/or in power conversion systems different from the power conversion system 200 of FIG. 2.

The power conversion method 300 may include transferring power at an input to the variable transformer to an output of the variable transformer (302). In an example, the input of the variable transformer may be coupled to a power source. The power source may be an AC power source, such as a power grid and/or a renewable energy source. In another example, the input of the variable transformer may be coupled to DC power source via an inverter that is configured to generate AC power from the DC power source. The variable transformer may include one or both of a tap changing transformer and a variable autotransformer. In some examples, the variable transformer may be the variable transformer 104 of FIG. 1 or the tap changing transformer 202 of FIG. 2. In other examples, other suitable variable transformers may be utilized.

The variable transformer may be controlled to regulate or otherwise control power conversion output of the variable transformer (304). In an example, the output voltage of the variable transformer may be regulated based on varying amount of power that may be available from the power source and/or based on varying power requirements of the load (e.g., one or more electromechanical stacks). In an example, a processor or controller may be coupled to a control input of the variable transformer, and the processor or controller may be configured to control the output voltage of the variable transformer based on varying amount of power that may be available from the power source and/or based on varying power requirements of the load (e.g., one or more electromechanical stacks). In other examples, other suitable control schemes may be utilized. In an example, the variable transformer may be configured to provide full power capacity control and/or full turndown voltage required by the load.

The power at the output of the variable transformer may be rectified using an invariable rectifier or may be inverted using an invariable inverter (306). The power may be rectified or inverted without providing any further controllable regulation by the invariable rectifier or the invariable inverter. Thus, full capacity control and/or full turndown voltage required by the load may be provided by control of the variable transformer. In various examples, providing full capacity control and/or turndown voltage range for the load by the variable transformer, without any additional capacity and/or turndown volage control provided by the invariable may simplify the power converter, and reduce the cost of the power converter, as compared to a power converter in which additional control is provided (e.g., by a thyristor rectifier), while still meeting system power control requirements.

Portions of the methods, devices, and systems, such as processing, and logic described above, may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry. Various example implementations have been included for illustration. Other implementations are possible.

Table 1 includes various examples.

TABLE 1

| Examples |
| --- |
| 1.  A device including: |
| a first port (e.g., an AC port); |
| a second port (e.g., a DC port); |
| a variable transformer coupled between the first and second ports; and |
| an invariable (e.g., uncontrolled) change component (such as an invariable rectifier |
|    and/or an invariable inverter) coupled between the variable transformer and the |
|    second port, where: |
| optionally, the device is configured to convert between AC (alternating current) power at |
| one of the ports and DC (direct current) power at the other port. |
| 2.  A device including: |
| a first port; |
| a second port; |
| a variable transformer coupled between the first and second ports; and |
| an invariable (e.g., uncontrolled) change component (such as an invariable rectifier |
|    and/or an invariable inverter) coupled between the variable transformer and the |
|    second port, where: |
| optionally, the device is configured to convert between AC (alternating current) power at |
|    one of the ports and DC (direct current) power at the other port. |

TABLE 1-continued

Examples

3. The device or method of any of the other examples in this table, where the AC
   port is coupled to:
an AC bus;
a power source, e.g., a grid, an on-site dedicated renewable source, and/or other power
   source; or
any grouping thereof.
4. The device or method of any of the other examples in this table, where the DC
   port is coupled to an electrolyzer stack.
5. The device or method of any of the other examples in this table, where the
   variable transformer includes:
a tap changing transformer;
an autotransformer; or
any grouping thereof.
6. The device or method of any of the other examples in this table, where the
   invariable rectifier (and/or inverter) includes:
optionally, a device other than a thyristor-based device; and
optionally, a diode based device, e.g., a diode rectifier, a six pulse diode rectifier, or other
   uncontrolled diode based device.
7. The device or method of any of the other examples in this table, where multiple
   transformers are coupled to the invariable and/or uncontrolled rectifier, where:
optionally, the multiple transformers are phase-shifted with respect to one another; and
optionally, the relative phase-shift of the transformers implements a cancellation effect,
   such as, harmonic cancellation.
8. The device or method of any of the other examples in this table, where controlling
   the output includes controlling the output with a bandwidth:
optionally, less than 5 Hz;
optionally, less than 2 Hz;
optionally, greater than 1 Hz;
optionally, less than 1 Hz;
optionally, greater than 0.5 Hz;
optionally, less than 0.5 Hz;
optionally, greater than 0.1 Hz;
optionally, less than 0.1 Hz;
optionally, greater than 0.05 Hz; and
optionally, less than 0.05 Hz.
9. The device or method of any of the other examples in this table, where the voltage
   of the input and/or output includes:
optionally, a voltage greater than 300 v;
optionally, a voltage less than 500 v;
optionally, a voltage greater than 500 v;
optionally, a voltage less than 500 v;
optionally, a voltage greater than 1000 v;
optionally, a voltage less than 1000 v;
optionally, a voltage greater than 2 kv;
optionally, a voltage less than 5 kv;
optionally, a voltage greater than 5 kv;
optionally, a voltage less than 10 kv;
optionally, a voltage greater than 10 kv;
optionally, a voltage less than 20 kv;
optionally, a voltage greater than 20 kv;
optionally, a voltage less than 33 kv;
optionally, a voltage greater than 33 kv;
optionally, a voltage less than 50 kv;
optionally, a voltage greater than 50 kv;
optionally, a voltage less than 100 kv;
optionally, a voltage greater than 100 kv;
optionally, a voltage less than 1000 kv; and
optionally, a voltage greater than 1000 kv.

One or more implementations of the disclosure may be referred to herein, individually and/or collectively, by the term "invention" merely for convenience and without intending to voluntarily limit the scope of this application to any particular invention or inventive concept. Moreover, although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding implementations illustrated in the present disclosure and are not meant to be limiting in any fashion. Nor do these phrases indicate any kind of preference for the disclosed implementations.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are within the scope of the disclosure. The claims should not be read as limited to the described order or elements unless stated to that effect. Therefore, all implementations that come within the scope and spirit of the following claims and equivalents thereto are included within the disclosure.

The invention claimed is:

1. A power converter device, including:
a first port;
a second port coupled to one or more electrolyzer stacks;
multiple variable transformers that are phase-shifted relative to one another to implement a harmonic cancellation effect, the multiple variable transformers coupled to the first port; and
an invariable rectifier coupled between the multiple variable transformers and the second port,
wherein the power converter device is configured to convert alternating current (AC) power at the first port to direct current (DC) power at second port, and
wherein the invariable rectifier is configured to operate without power regulation input to the invariable rectifier.

2. The power converter device of claim 1, wherein the multiple variable transformers include one or both of a tap changing transformer and a variable autotransformer.

3. The power converter device of claim 1, wherein the multiple variable transformers are configured to provide full capacity control and/or a full turndown voltage range required by the one or more electrolyzer stacks.

4. The power converter device of claim 1, wherein the first port is coupled to an AC bus and/or an AC power source.

5. The power converter device of claim 4, wherein the AC power source includes one or both of a power grid and a renewable energy source.

6. The power converter device of claim 1, wherein the first port is coupled to an AC power source, and
wherein the invariable rectifier includes an invariable diode rectifier.

7. A method including:
converting alternating current (AC) power from an AC power source to be provided as direct current (DC) to one or more electrolyzer stacks by:
transferring, via multiple variable transformers, the AC power from the AC power source to an output of the variable transformer, wherein the multiple variable transformers are phase-shifted relative to one another to implement a harmonic cancellation effect;
controlling the variable transformer to control power conversion output of the variable transformer; and
rectifying the AC power at the output of the variable transformer using an invariable rectifier,
wherein the invariable rectifier is configured to operate without power regulation input to the invariable rectifier.

8. The method of claim 7, wherein transferring the AC power by the multiple variable transformers comprises transferring the AC power using a tap changing transformer and/or a variable autotransformer.

9. The method of claim 7, wherein rectifying the AC power using the invariable rectifier includes rectifying the power using an invariable diode rectifier.

10. The method of claim 7, wherein controlling the multiple variable transformers includes controlling the multiple variable transformers to provide full capacity control required by the one or more electrolyzer stacks and/or a full turndown voltage range required by the one or more electrolyzer stacks.

11. The method of claim 7, wherein the AC power source includes one or both of a power grid and a renewable energy source.

* * * * *